E. RIMAILHO.
REGULATING DEVICE FOR THE FLOW OF LIQUID IN ORDNANCE BUFFERS.
APPLICATION FILED SEPT. 7, 1918.
1,315,861.
Patented Sept. 9, 1919.
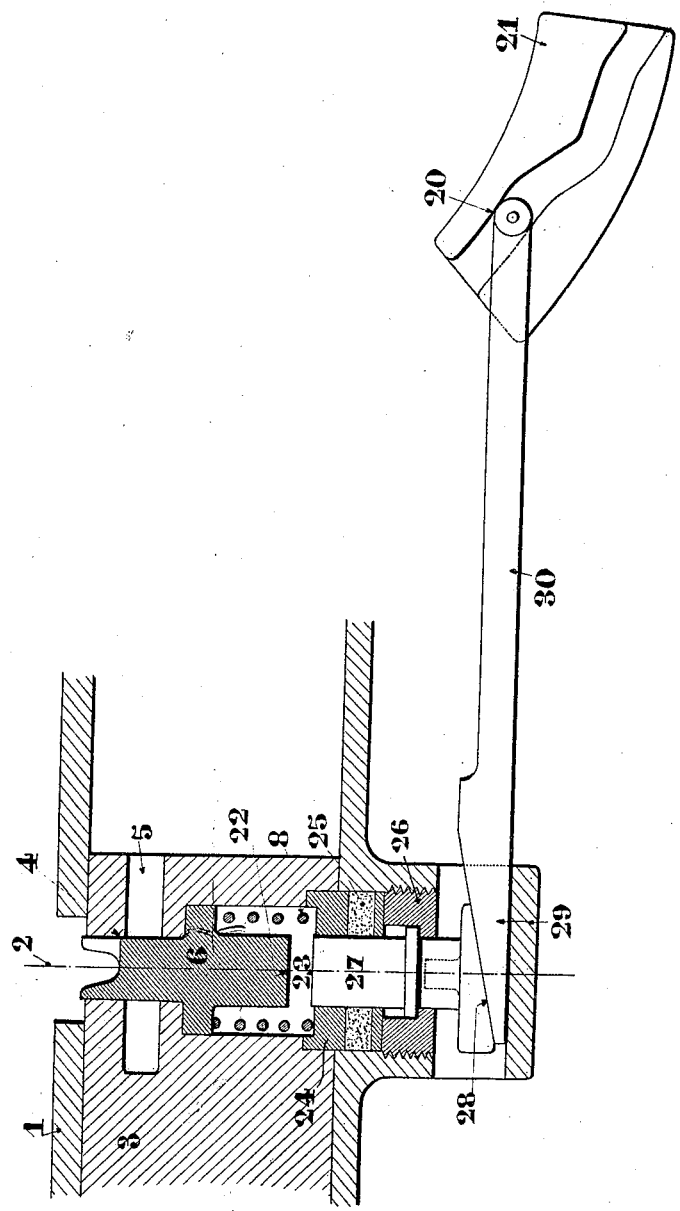
INVENTOR
E. Rimailho
BY
ATTORNEYS

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

REGULATING DEVICE FOR THE FLOW OF LIQUID IN ORDNANCE-BUFFERS.

1,315,861. Specification of Letters Patent. Patented Sept. 9, 1919.

Original application filed July 27, 1917, Serial No. 183,204. Divided and this application filed September 7, 1918. Serial No. 253,052.

*To all whom it may concern:*

Be it known that I, EMILE RIMAILHO, a citizen of France, residing in Paris, France, have invented a new and Improved Regulating Device for the Flow of Liquid in Ordnance-Buffers, of which the following is a full, clear, and exact description.

My invention relates to regulating devices for the flow of liquid in the ordnance-buffers and forms a divisional application of my application, Serial No. 183,204, filed July 27, 1917, and from which it is characterized by an external control for regulating the flow.

In the ordnance-buffers, the flow of the liquid, during the recoil of the gun, is regulated so as to cause a resistance calculated in view of absorbing the whole momentum with which the recoiling mass is moving, and that, on the available recoil-length. For utilizing all the qualities of an ordnance, it is advantageous to be able to regulate this flow according to the conditions of firing; particularly when the angle of firing decreases, it is of interest to obtain an increased recoil in order to keep a better stability.

The device which is the object of the invention realizes accurately the regulation of the flow of the liquid in an ordnance-buffer according to the angular displacements imparted to the gun by automatically varying the area of the flow-orifice. Said device may equally be adapted to a hydraulic buffer or to a hydropneumatic buffer, in which the liquid at rest is under pressure or not. It offers the peculiarity of having its regulating organs located inside the buffer in the same block of metal, and these organs are connected with the external drive only by a single rod or like organ, which enables to easily secure the tightness of the whole.

The accompanying drawing illustrates, by way of example, the application of the device to hydropneumatic buffers and shows a flow-regulating device, the controlling organs of which are external.

Referring to the drawings, 1 is the buffer body in which an orifice 2 forms an inlet for the liquid into the regulating body 3. This buffer body is tubular and receives the plunger or piston of the recoil mechanism, which is connected to the barrel of the gun. The regulator body 3 has an orifice 4 establishing communication between the communication orifices 2 and 5, the latter serving as an outlet from the regulator. The orifice 5 leads into a tubular chamber, which receives the liquid discharged through the orifice, upon the recoil of the gun. The orifice 4 is engaged by a recoil valve 6 under the action of a coil spring 8. The displacement of the valve 6 against the resistance of the coil spring is regulated by an abutment rod 27 guided by the members 24, 25 and 26 forming the packing for said rod 27. The rod 27 terminates with an incline 28 outside of the packing which contacts with the regulating wedge 29 forming part of the controlling rule 30. The rule carries a roller 20 engaged in the groove of the cam 21. It is thus seen that upon the recoil of the gun, the compressed liquid will discharge from the tubular buffer body 1, through orifice 2 and through orifice 4, by depressing valve 6, the liquid then discharging through orifice 5 into the collecting chamber or cylinder.

In sighting, the roller 20 follows the carefully calculated sinuosities of the cam 21 which causes the displacement of the rod 27 whereby the clearance between the valve and rod is varied and, therefore, the displacement of the valve, in consequence automatically regulating the area of the orifice 4 for obtaining the variations of resistance to the flow of liquid in function of the angles of firing.

This device is particularly applicable to a buffer the rear face of which is not easily accessible, for instance, when the enlargement of the breech ring is placed too near to the buffer body.

I claim:

1. A regulating device for the flow of liquid in ordnance buffers, comprising a member provided with a passage for communication with the tubular buffer body and adapted to discharge into a receiving chamber, a valve for controlling the passage of liquid through said passage, a spring to normally hold the valve in closed position, a movable member arranged in the path of travel of a portion of the valve to limit its opening movement, and means to adjust the member toward and away from the valve, said means being automatically operated by the angular adjustment of the gun.

2. A regulating device for the flow of liquid in ordnance-buffers comprising a valve-controlled opening, a sliding member adapted to limit the displacement of the valve in the opening, a spring normaly tending to maintain the valve closed, a wedge for varying the distance between the sliding member and the valve, and a cam operable by the vertical displacement of the ordnance for moving the wedge substantially as and for the purpose set forth.

3. A regulating device for the flow of liquid in ordnace-buffers comprising an inlet, a valve for the inlet, a spring engaging the valve for closing the inlet, a rod adapted to move to and from the valve, an incline associated with said rod, a wedge engaging the incline, and a cam operable by the vertical displacement of the ordnance having means for engaging the wedge whereby the rod may be moved to and from the valve and whereby the displacement of the valve is controlled substantially as and for the purpose set forth.

EMILE RIMAILHO. [L. S.]

Copies of this patent may be obtained for five cents each, by addressing the "Commissioner of Patents, Washington, D. C."